June 27, 1967  I. L. FREEMAN ETAL  3,327,376
OBJECT INSTALLING AND REMOVING DEVICE
Filed June 8, 1966  2 Sheets-Sheet 1

INVENTORS:
IRVING L. FREEMAN
BY WILLIAM HABER
Elliott & Pastoriza
ATTORNEYS

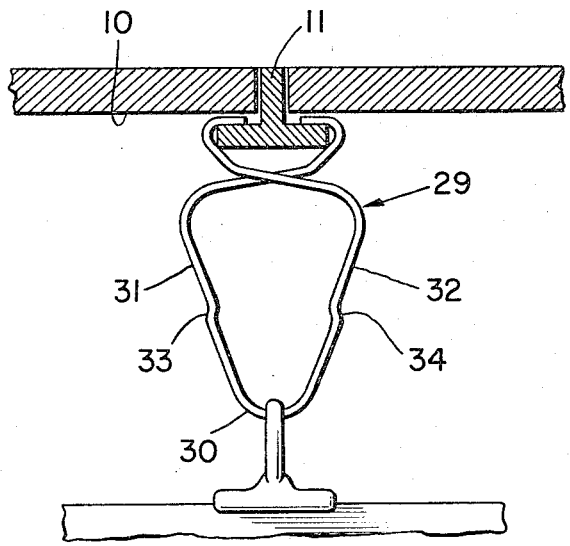
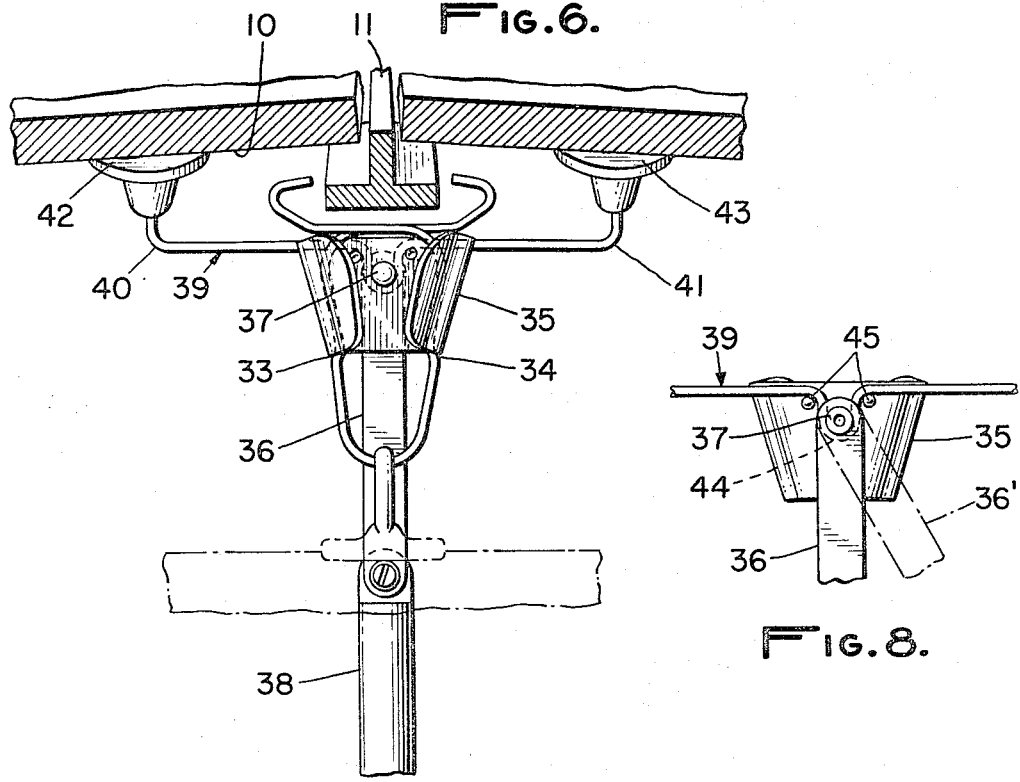

United States Patent Office 3,327,376
Patented June 27, 1967

3,327,376
OBJECT INSTALLING AND REMOVING DEVICE
Irving L. Freeman, 4458 Nogales Drive, and William Haber, 5812 Donna, both of Tarzana, Calif. 91356
Filed June 8, 1966, Ser. No. 560,372
4 Claims. (Cl. 29—225)

ABSTRACT OF THE DISCLOSURE

This disclosure describes a tool for cooperating with a hook element for suspending objects from store ceilings such as in super markets and other large commercial establishments. The hook element includes a general U-shaped portion with the upper arms of the U crossing over and extending in opposite directions and then turning inwardly toward each other to define individual hooks. By squeezing the lower portions of the U arms, the outer hooks are thus spread further apart and may be hooked around the lower flange of a ceiling joist. Cooperating with this hook element is an installing tool including a curved plate structure defining opposed converging walls arranged to receive the U portion of the hook element and squeeze the U arms together to spread the outer hooks. The curved plate is secured to the end of a long pole so that once the hook element is urged into the funnel-like opening of the curved plate so as to hold its outer hooks spread apart, an object to be suspended may in turn be secured to the hook element and the hook element raised by the plate and pole structure to engage about opposite longitudinal edges of the ceiling joist flange. Removal of the curved plate structure from the U portion of the hook element will then permit the outer hooks to come together and grip the edges of the flange so that the object is suspended by the hook element from the ceiling. The object may be removed by simply again urging the funnel-like opening defined by the curved plate structure over the U portion of the hook element in such a manner as to again spread the outer hook portions and release the same from the flange edges. The device or object hung from the hook may then be lowered.

---

This invention is a continuation in part of our co-pending application Ser. No. 376,501, filed June 19, 1964, now abandoned, and entitled, Object Installing and Removing Device.

In many stores, super markets, and the like, it is common practice to suspend from the ceiling various displays such as large cards advertising various foods or other products. In other instances, it may be desirable to suspend different types of decorations. In all such cases, the displays are usually temporary and may periodically be changed. As a consequence, it is ordinarily necessary for a worker in the store to use a high step ladder to remove and install new displays.

In our United States Patent No. 3,129,028 issued April 14, 1964, for Magnet Manipulating Pole, there is disclosed a long pole terminating in a magnet-holding structure adapted to cooperate with a magnet for securing displays and the like from magnetic objects such as iron channels, lamp structures or similar metal objects along the ceiling or in high places. The present invention has to do with a device for performing a similar function except mechanical holding means rather than magnetic means are used for enabling easy installing and removing of displayed objects.

Accordingly, a primary object of this invention is to provide a novel mechanical type device for suspending various different objects from high places without the necessity of step ladders or scaffolding, to the end that displays or decorations may be rapidly changed as desired.

More particularly, objects are to provide an installing and removing device which is easy to use, reliable in operation, and which incorporates only two major elements to the end that simplicity and economy are assured.

Still another object is to provide a display installing and removing device particularly useful for suspending objects from the side edges of the bottom flange of a ceiling joist normally encountered in ceiling constructions of super markets, large stores, and the like.

Briefly, these and other objects and advantages of this invention are attained by providing a hook element of general U shape at its lower end, the arms of the U extending upwardly and thence being bent towards each other to cross over and extend in opposite directions. The far ends of the arms turn back towards each other to define horizontally spaced hooks. The lower U portion of this hook element is connected to an object to be suspended.

Cooperating with this hook element is an installing tool in the form of a curved plate structure defining an opening having spaced walls. In a preferred embodiment of the invention, the walls are tapered towards each other in a downward direction to define a funnel-like opening. The arrangement is such that the lower U portion of the hook element may be received in the funnel-like opening between the spaced walls. Urging of the hook element into this opening will cam the lower U portions of the arms together thereby causing the outer hooks to spread further apart. These hooks may then be caused to straddle the opposite longitudinal edges of the lower flange of a ceiling joist. Removal of the tool then permits the natural resiliency of the hook element to cause the hooks to come towards each other and thus engage the opposite longitudinal edges of the flange.

The curved place structure itself may be secured to the end of an extension pole so that the hook element with a suitable display object secured to the lower portion thereof may be lifted to a ceiling and installed as described.

Removal of the object and hook element is achieved by simply urging the funnel-shaped opening of the curved plate up against the lower U portion of the hook element. This action spreads the opposed hooks to release the hook element from the channel and enable lowering of the display object.

A better understanding of the invention will be had by now referring to a preferred embodiment thereof as illustrated in the accompanying drawings, in which:

FIGURE 6 is a view similar to FIGURE 2 illustrating a modified hook element;

FIGURE 7 is an elevational view of a modified installing tool designed to cooperate with the hook element of FIGURE 6; and, FIGURE 8 is a rear fragmentary view of a portion of the modified installing tool of FIGURE 7.

Figure 1:
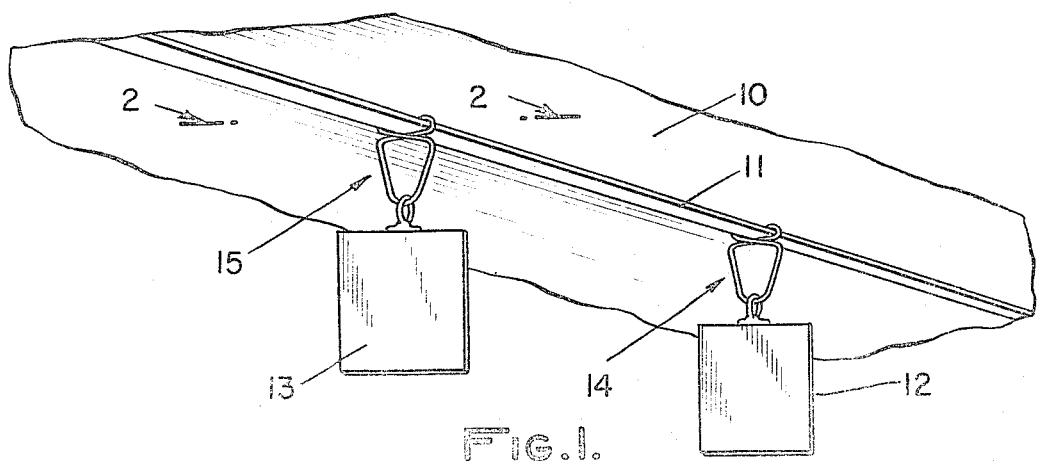
FIGURE 1 is a fragmentary perspective view illustrating various objects suspended from the lower flange of a ceiling joist along a ceiling in accordance with the invention.

Referring first to FIGURE 1, there is shown a portion of a store ceiling 10 including a longitudinally extending joist having a lower flange 11. As shown, various display objects 12 and 13 are suspended from the flange 11 as by hook elements 14 and 15 designed in accordance with the present invention.

Figures 2, 3:
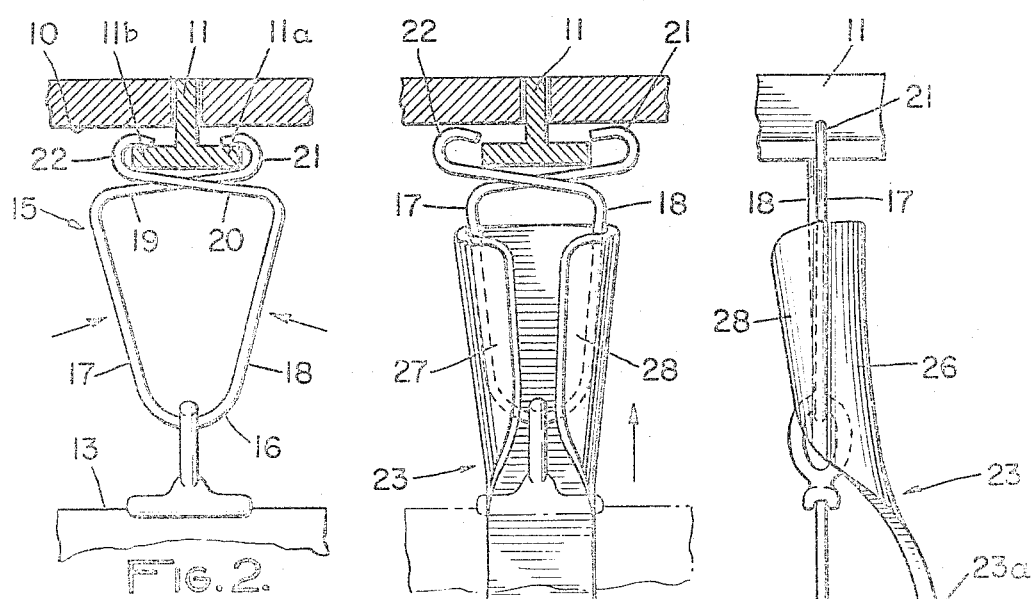
FIGURE 2 is an enlarged fragmentary cross-section taken in the direction of the arrows 2—2 of FIGURE 1.
FIGURE 3 is a front elevational view of the installing tool and cooperating hook element illustrated in FIGURE 2.

In FIGURE 2, there is illustrated in detail the hook element 15. As shown, this element includes a lower U shaped portion 16 to which the display object 13 may be coupled. The arms of the U shape are indicated at 17 and 18 and extend upwardly and thence towards each other as at 19 and 20 to cross over and extend in opposite directions. The far ends of the arms terminate in hooks 21 and 22 respectively. These hooks are formed by the bending of the far ends back towards each other to define open hook portions which are in spaced horizontal relationship. As shown in FIGURE 2, these hooks straddle and are in engagement with the opposite longitudinal edges 11a and 11b on the flange 11.

It will be evident from the construction of the hook element that if a squeezing or camming force is exerted on the lower portions of the U arms 17 and 18 in the direction of the arrows, the upper hooks 21 and 22 will be biased or urged apart. If this camming force is released, the natural resiliency of the hook element will result in the hooks 21 and 22 coming together.

To effect the foregoing camming action from a distance, there is provided an installing and removing tool 23 as illustrated in FIGURE 3. This tool may be secured to an elongated extension pole, a portion of which is shown at 24 as by a screw 25. The tool itself is formed from an integral curved plate 26 of a general funnel-like shape having opposite tapered walls 27 and 28. The taper is such that the walls converge towards each other in a downward direction as shown.

With the foregoing arrangement, it will be clear that if the hook element is urged downwardly into the funnel-like upper opening of the curved plate 26, or alternatively, if the curved plate is urged upwardly in the direction of the arrow of FIGURE 3, the arms 17 and 18 of the U shape will be cammed or squeezed together thereby spreading the hooks 21 and 22 apart. In this respect, it should be noted that the arms 17 and 18 in their natural position may diverge upwardly as is the case at the immediate lower U portion so that the sidewalls 27 and 28 could be opposed and parallel to each other to define a more or less channel shape rather than a taper. With this design, the diverging arms 17 and 18 would still be subject to a squeezing force as the hook element is received within the curved plate structure.

Figure 4:
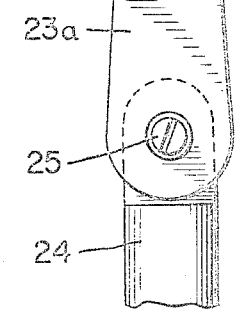
FIGURE 4 is a side view of the structure illustrated in FIGURE 3.

In FIGURE 4, the shape of the curved plate structure will be evident wherein an integral lower extending portion 23a thereof is bent away from the lower opening of the funnel shape at the point where it is secured to the upper end of the extension pole 24. By this arrangement, any object or article such as 13 suspended from the hook element may hang without interference with the plate structure.

Figure 5:
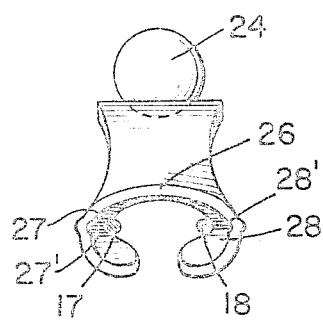
FIGURE 5 is a top view looking downwardly on the installing tool.

FIGURE 5 illustrates in top plan view the appearance of the funnel-like upper opening wherein the converging of the side walls 27 and 28 will be evident. Preferably, small grooves 27' and 28' are formed on the inner walls to receive the arms 17 and 18 and thus inhibit twisting.

The operation of the object installing and removing device will be evident from the foregoing description. Initially, the display object 13 is suspended from the lower U portion of the hook element. The hook element has its lower U portion inserted through the front slot in the curved plate structure as illustrated in FIGURE 3 such that the hooks 21 and 22 are spread or biased apart. With the hook element so held, a worker may then simply raise the entire hook element and display by the elongated extension pole to the ceiling to position the hooks 21 and 22 adjacent opposite longitudinal edges of the flanges 11. The worker may then skew or twist the pole slightly so that the hooks 21 and 22 will engage the opposite longitudinal edges of the flange 11. This skewing permits an engagement to take place without the hooks 21 and 22 being closed together.

With the ends of the hooks 21 and 22 resting on the upper surfaces of the longitudinal edges of the flange, the worker then pulls downwardly on the pole which will release the arms 17 and 18 and permit them to spread thereby causing the hooks 21 and 22 to move towards each other which action will skew the hooks in a manner to straddle directly opposite edge portions of the flange. The display object will then be securely coupled to the flange for display purposes.

When it is desired to remove the object which is on display, the worker may, from the floor, raise the pole and plate structure and urge the plate structure against the U shaped portion of the hook element so that the element is received in the upper funnel-like opening. This action biases the arms 17 and 18 together which causes the hooks 21 and 22 to separate as illustrated in FIGURE 3. With the hooks so separated, they are free of the edges of the flange and hook element and display object may then be lowered.

Referring now to FIGURE 6 there is shown a modified hook element 29 including a U portion 30 with upwardly diverging arm portions 31 and 32. This hook element is similar to the hook element 15 of FIGURE 2 except that there are provided small outwardly directed jogs 33 and 34 in the diverging portions of the arms 31 and 32. The purpose for these jogs will become clear by now referring to FIGURE 7.

In FIGURE 7 there is shown a modified curved plate structure 35 having an oval funnel-like shape similar to that described in FIGURES 3, 4 and 5 but of less depth such that when the curved plate 35 engages the arms of the hook element, the jogs 33 and 34 cradle under the lower ends of the curved plate. By this arrangement, the possibility of the hook element camming itself out of the funnel-like shape is inhibited.

Also illustrated in the modified curved plate structure 35 of FIGURE 7 is a rear elongated plate 36 pivoted at its upper end such as at 37 to the curved plate structure 35 and secured at its lower end to a pole 38.

The curved plate tool 35 in the embodiment illustrated in FIGURE 7 includes an elongated transverse rod 39 secured to the rear of the plate 35 and terminating in extended upturned portions 40 and 41 supporting engaging pads 42 and 43. By means of this additional structure to the curved plate 35, it is possible to lift slightly the ceiling panels such as the panel 10 from the lower flange 11 of the ceiling joist by means of the engaging pads 42 and 43 so as to facilitate insertion of the hook portions of the hook element 29 over the flange. These same engaging pads 42 and 43 will facilitate removal of the hook element by lifting the ceiling panels away from the flange.

In FIGURE 8, it will be noted that the elongated rod 39 may be secured in its transverse position on the rear of the curved plate 35 by curving the rod as at 44 to pass around the pivot structure 37 beneath the plate 36. Suitable projections 45 are provided on the rear of the curved plate structure to stabilize the rod against rocking movement. Thus, the pivoted connection 37 for the plate 36 also serves to secure the rod 39. This pivot however will permit the plate 36 to swing such as to the dotted line position 36. Such angulation may be desirable when using the pole 38 for installing or removing an object which is not directly overhead.

From the foregoing description, it will thus be evident that the present invention has provided a unique installing and removing device. The entire structure consists of only two separate elements in the form of the hook element and the curved plate structure with or without the ceiling panel engaging pads.

While only two particular embodiments of the invention have been shown and described, minor variations that fall clearly within the scope and spirit of the invention will occur to those skilled in the art. The object installing and removing device is therefore not to be thought of as limited to the specific embodiments set forth merely for illustrative purposes.

What is claimed is:

1. An object installing and removing device for suspending objects from a ceiling joist flange wherein there is provided: a hook element of general U shape at its lower end adapted to be connected to an object, the arms of said U shape extending upwardly and diverging from each other, the diverging portions including small outward jogs, said arms thence extending inwardly to cross and extend past each other in opposite directions, the outer ends of said arms terminating in hooks having their open end portions facing towards each other in horizontally spaced relationship so that squeezing of the lower diverging portions of said arms adjacent said U shape spreads said hooks further apart, said device comprising: a curved plate defining an oval funnel-like shape, the upper end of which is open and the walls of which converge towards each other in a downward direction for a given depth whereby said arms of said U shape may be received and urged downwardly into said funnel-like shape, said depth being such that said jogs cradle the lower end opening of said funnel-like shape to inhibit canting out of said hook element, said arms being squeezed to spread said hooks apart sufficiently to straddle opposite edges of said flange, removal of said curved plate permitting said hooks to move towards each other and hook onto said opposite edges of said flange and be held thereby.

2. A device according to claim 1, in which said curved plate structure includes a lower extending portion bent away from said lower end opening in said funnel-like shape so that objects connected to said U shape portion of said hook element may hang vertically without interference with said tool.

3. A device according to claim 1, in which the portions of said converging walls of said funnel-like shape engaged by said arms define grooves receiving said arms to inhibit twisting of said hook element when received in said funnel-like shape.

4. A device according to claim 1, including a transverse rod means secured to the rear of said curved plate and terminating in up-turned ends supporting ceiling engaging pads at a level above said free ends of said hook element when said hook element is received in said funnel-like shape, said pads functioning to lift any ceiling panels free of said ceiling joist flange to facilitate installing or removing operations.

References Cited

UNITED STATES PATENTS

| | | | |
|---|---|---|---|
| 1,702,319 | 2/1929 | Sargent et al. | 294—19 X |
| 1,916,827 | 7/1933 | Cremer et al. | 29—222 |
| 2,890,519 | 6/1959 | Storz | 29—225 |
| 3,175,280 | 3/1965 | Henges | 29—225 |

WILLIAM FELDMAN, *Primary Examiner.*

J. C. PETERS, *Assistant Examiner.*